J. L. BURTON.
CULTIVATOR.
APPLICATION FILED JAN. 13, 1911.
996,562.
Patented June 27, 1911.
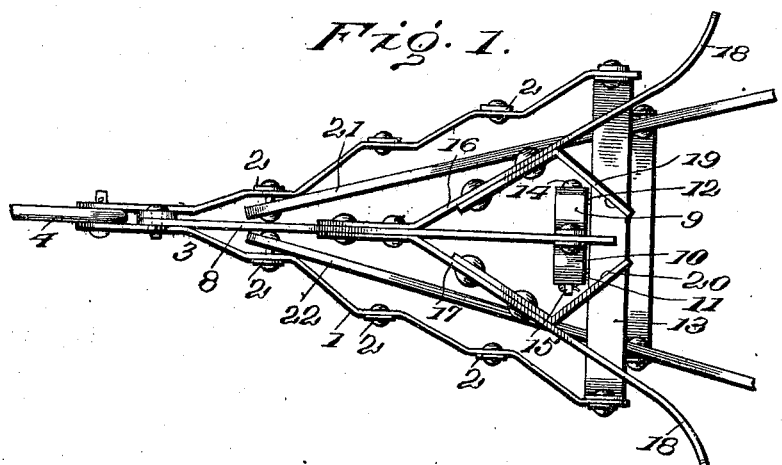
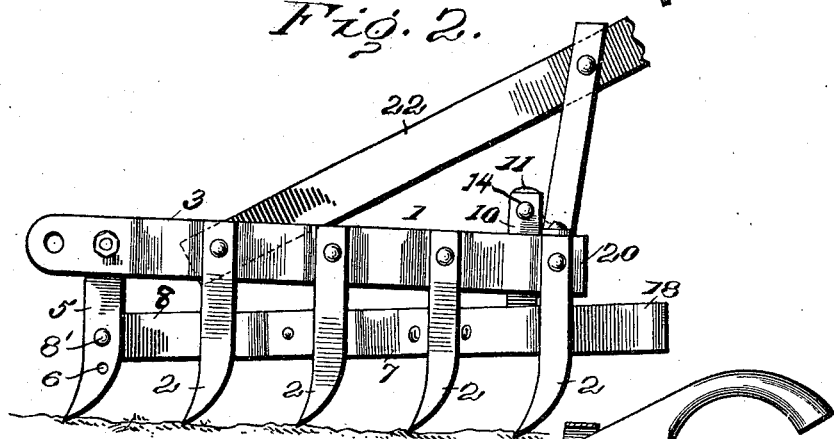
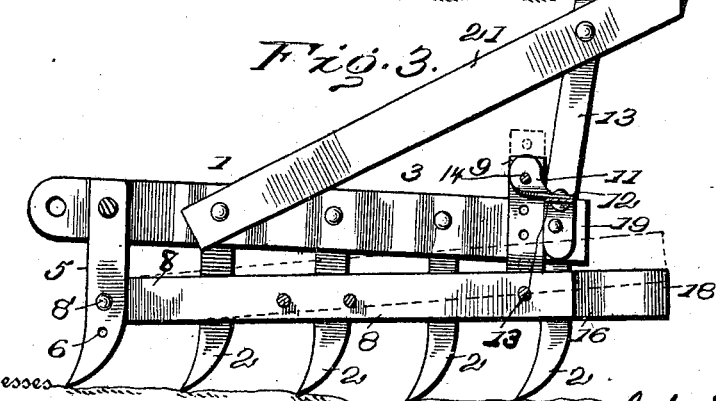

UNITED STATES PATENT OFFICE.

JUDSON L. BURTON, OF SIBLEYTON, MISSISSIPPI.

CULTIVATOR.

996,562.  Specification of Letters Patent.  Patented June 27, 1911.

Application filed January 13, 1911. Serial No. 602,488.

*To all whom it may concern:*

Be it known that I, JUDSON L. BURTON, a citizen of the United States, residing at Sibleyton, in the county of Montgomery and State of Mississippi, have invented certain new and useful Improvements in Cultivators, of which the following is a specification.

This invention relates to improvements in cultivators.

The object of my invention is to provide a cultivator having means whereby the ground is leveled off and rubbed down after having been acted upon by the teeth of the cultivator.

Another object of my invention is to provide a simple, cheap and effective cultivator of this character having certain improvements in details of structure hereinafter more fully set forth.

In the accompanying drawings;—Figure 1, is a bottom plan view of my improved cultivator. Fig. 2, is a side elevation of the same, certain features not being shown. Fig. 3, is a longitudinal vertical sectional view of the structure as shown by Fig. 2.

Referring to the specific example illustrated in the accompanying drawings, I show a cultivator frame consisting of rearwardly diverging beams 3, secured together at their front ends to form the nose or point of the cultivator provided with clevis or other draft attachment 4, and front depending plow or cultivator tooth 5. The rear ends of the cultivator beams can be braced and connected in any suitable manner as by a cross bar 13, as shown, and the cultivator frame, described, can be provided with any suitable handles, such as connected and upwardly and rearwardly extending handles 21, 22. The frame bars 3, can diverge rearwardly step by step as shown by Fig. 1, to provide a succession of straight portions, parallel with each other and with the line of draft, to receive the cultivator teeth 2, said teeth being suitably secured to said parallel portions of the frame and presenting their edges to the soil in moving forwardly. I provide this cultivator frame with a suitable soil leveling and furrow covering drag, which can be hung beneath and arranged centrally and longitudinally of the frame. In the example illustrated, this drag is at its front end pivotally joined to the front cultivator tooth 5, through the medium of removable bolt 8', entering any one of a vertical series of bolt holes 6, in said tooth, whereby the front end of the drag can be adjusted vertically. I show the drag consisting of a central longitudinal bar 8, arranged beneath the cultivator frame and between the rows of cultivator teeth, and extended rearwardly to a point between the rear ends of the beams 3, and the rear portion of said bar 8, can be provided with uprights 9, 10, at their lower ends fixed thereto and rising therefrom beside the upturned ends of brackets 11, 12, fixed to the rear cross bar 13, of the cultivator frame. The uprights 9, 10, are provided with vertical series of bolt holes to register with bolt holes in the upturned ends of the brackets 11, 12, and a removable cross bolt 14, having cotter pin 15 (or other suitable means) is provided to pass through the uprights and bracket ends to uphold the rear end of the drag in the desired vertical position with respect to the cultivator frame, and whereby the drag can be adjusted vertically. The drag is provided with rearwardly extending diverging covering and leveling wings 18, in rear of the cultivator frame, and the series of teeth carried by beams 3, respectively, and these wings can be formed by the outturned or curved ends of bars 16, 17, at their forward ends bolted to opposite sides of about the central portion of drag bar 8.

The ground can be smoothed and leveled between the wings 18, by smoothing wings, blades or arms 19, 20, at their forward ends bolted to the bars 16, 17, respectively, and extending rearwardly and inwardly therefrom and hence converging rearwardly, and adapted to cover central furrows not reached by the bars 16, 17, as well as to smooth and level the ground. It will be observed that this smoothing drag operates on the surface of the soil after it has been worked over by the cultivator teeth.

This cultivator is peculiarly adapted to receive a detachable frame carrying seed and fertilizer dropping devices and operating devices therefor comprising a wheel adapted to be rotated by engagement with the soil, preferably traveling in the furrow of the forward tooth or plow 5. This planter attachment can be readily bolted to the cultivator frame below the handles and can be easily removed therefrom with its operating wheel, when the cultivator is to be used solely for cultivating purposes. This planter attachment is designed to drop the seed and fertilizer in advance of the rear leveling and smoothing portions of the drag which serve as coverers thereof.

While I have shown my invention applied to a specific form of cultivator, it will be understood that the form of cultivator could be varied without departing from my invention.

Having fully described my invention, I claim and desire to secure by Letters Patent, 1. The combination with a cultivator, of arms pivoted to the front teeth of the cultivator and extending rearwardly adapted to smooth the ground after having been acted upon by the teeth of the cultivator.

2. The combination of a cultivator, having a central front tooth, a bar pivoted to said tooth, means for adjustably securing the rear end of the bar to the cultivator and smoothing arms carried by said bar and extending rearwardly.

3. The combination with a wedge shaped cultivator with a bar pivoted to the front tooth of the cultivator, upwardly extending members carried by the rear end of the bar and having a series of openings therein, a bar adapted to secure said members to the frame of the cultivator, arms rigidly secured to the bar, intermediate its ends and extending rearwardly and outwardly beyond the rear teeth of the cultivator and inwardly extending arms secured to inner faces of the first mentioned arms intermediate their ends.

4. The combination with a wedge shaped cultivator, of a bar pivoted to the front tooth thereof, means adjustably securing the rear end of the bar to the cultivator, arms carried by the bar on the inside of the cultivator teeth and inwardly extending arms carried by the first mentioned arms.

In testimony whereof I affix my signature in presence of two witnesses.

JUDSON L. BURTON.

Witnesses:
R. B. WOOLEY,
P. F. MITCHELL.

---

Copies of this patent may be obtained for five cents each, by addressing the "Commissioner of Patents, Washington, D. C."